(12) United States Patent
Jilani et al.

(10) Patent No.: US 9,910,903 B1
(45) Date of Patent: Mar. 6, 2018

(54) AUTONOMOUS DECISION SUPPORT SYSTEM USING CONFIGURATION INFLATION BASED ETL AND CONTENT MODELING

(71) Applicant: CA, Inc., New York, NY (US)

(72) Inventors: Abdul Khader Jilani, Andhra Pradesh (IN); MuthuVadugan Palaniappan, Karaikudi (IN)

(73) Assignee: CA, Inc., New York, NY (US)

( * ) Notice: Subject to any disclaimer, the term of this patent is extended or adjusted under 35 U.S.C. 154(b) by 347 days.

(21) Appl. No.: 14/635,099

(22) Filed: Mar. 2, 2015

(51) Int. Cl.
*G06F 17/30* (2006.01)

(52) U.S. Cl.
CPC .............................. *G06F 17/30563* (2013.01)

(58) Field of Classification Search
CPC ............................................... G06F 17/30563
See application file for complete search history.

(56) References Cited

U.S. PATENT DOCUMENTS

| | | | |
|---|---|---|---|
| 7,418,453 B2 | 8/2008 | Chowdhary et al. | |
| 8,671,084 B2 | 3/2014 | Chowdhary et al. | |
| 2005/0071359 A1 | 3/2005 | Elandassery et al. | |
| 2006/0195492 A1 | 8/2006 | Clark et al. | |
| 2006/0242624 A1* | 10/2006 | Mueller-Klingspor | G06F 17/30914 717/114 |
| 2007/0136324 A1* | 6/2007 | Xu | G06F 17/30563 707/999.1 |
| 2010/0287014 A1* | 11/2010 | Gaulin | G06F 17/30011 705/342 |
| 2011/0295793 A1* | 12/2011 | Venkatasubramanian | G06F 17/30563 707/602 |
| 2011/0313969 A1* | 12/2011 | Ramu | G06F 17/30563 707/602 |

* cited by examiner

*Primary Examiner* — Khanh Pham
(74) *Attorney, Agent, or Firm* — Coats & Bennett, PLLC

(57) ABSTRACT

A computer-implemented method is disclosed which detects a change in a set of data sources of a DSS, such as addition of a new data source, removal of an existing data source, or a schema change of an existing data source in the set. A first set of DSS updates for pending ETL jobs of an ETL engine of the DSS are automatically determined based on the change in the set of data sources. The method automatically updates, without canceling, the pending ETL jobs of the ETL engine based on the first set of DSS updates. A second set of DSS updates for a semantic layer of a BI engine of the DSS are automatically determined based on the change in the set of data sources and based on the first set of DSS updates. The semantic layer is automatically updated based on the second set of DSS updates.

19 Claims, 10 Drawing Sheets

SAMPLES OF HISTORICAL DATA 200

| DATA MODEL | SOURCE TABLE TYPE | SOURCE CHANGE | OUTPUT |
|---|---|---|---|
| DIMENSIONAL MODELING | LOOKUP | ADD COLUMN | ALTER TABLE ADD COLUMN |
| DIMENSIONAL MODELING | LOOKUP | DELETE COLUMN | ALTER TABLE DROP COLUMN |
| DIMENSIONAL MODELING | LOOKUP | MODIFY COLUMN | ALTER TABLE MODIFY COLUMN |
| DIMENSIONAL MODELING | TRANSACTION | ADD COLUMN | ALTER TABLE ADD COLUMN |
| DIMENSIONAL MODELING | TRANSACTION | DELETE COLUMN | ALTER TABLE DROP COLUMN |
| DIMENSIONAL MODELING | TRANSACTION | MODIFY COLUMN | ALTER TABLE MODIFY COLUMN |
| SATELLITE HUB | LOOKUP | ADD COLUMN | ALTER TABLE ADD COLUMN |
| SATELLITE HUB | LOOKUP | DELETE COLUMN | ALTER TABLE DROP COLUMN |
| SATELLITE HUB | LOOKUP | MODIFY COLUMN | ALTER TABLE MODIFY COLUMN |
| SATELLITE HUB | TRANSACTION | ADD COLUMN | ALTER TABLE ADD COLUMN |
| SATELLITE HUB | TRANSACTION | DELETE COLUMN | ALTER TABLE DROP COLUMN |
| SATELLITE HUB | TRANSACTION | MODIFY COLUMN | ALTER TABLE MODIFY COLUMN |
| DIMENSIONAL MODELING | NA | ADD NEW SOURCE | CREATE TABLE |
| SATELLITE HUB | NA | ADD NEW SOURCE | CREATE TABLE |
| DIMENSIONAL MODELING | LOOKUP | ADD NEW SOURCE | CREATE TABLE AND ADD REFERENCE TO FACT ADD NEW COLUMN TO FACT |
| SATELLITE HUB | LOOKUP | ADD NEW SOURCE | CREATE TABLE SATELLITE CREATE TABLE HUB ADD REFERENCE TO HUB |
| DIMENSIONAL MODELING | LOOKUP | ADD COLUMN | ALTER TABLE ADD COLUMN |
| DIMENSIONAL MODELING | LOOKUP | DELETE COLUMN | ALTER TABLE DROP COLUMN |
| DIMENSIONAL MODELING | LOOKUP | MODIFY COLUMN | ALTER TABLE MODIFY COLUMN |
| SATELLITE HUB | LOOKUP | ADD COLUMN | ALTER TABLE ADD COLUMN |
| SATELLITE HUB | LOOKUP | DELETE COLUMN | ALTER TABLE DROP COLUMN |
| DIMENSIONAL MODELING | NA | ADD NEW SOURCE | CREATE TABLE |
| SATELLITE HUB | NA | ADD NEW SOURCE | CREATE TABLE |
| DIMENSIONAL MODELING | LOOKUP | ADD NEW SOURCE | CREATE TABLE AND ADD REFERENCE TO FACT ADD NEW COLUMN TO FACT |
| DIMENSIONAL MODELING | LOOKUP | DELETE COLUMN | ALTER TABLE DROP COLUMN |
| DIMENSIONAL MODELING | LOOKUP | MODIFY COLUMN | ALTER TABLE MODIFY COLUMN |
| SATELLITE HUB | LOOKUP | ADD COLUMN | ALTER TABLE ADD COLUMN |

FIG. 5A

REVERSE PROBABILITY TABLE FOR CASES 220

| REVERSE PROBABLILITIES | VALUE |
|---|---|
| P(DIMENSIONAL MODELING \| ALTER TABLE ADD COLUMN) | 0.929408343 |
| P(DIMENSIONAL MODELING \| ALTER TABLE DROP COLUMN) | 0.611101003 |
| P(DIMENSIONAL MODELING \| ALTER TABLE MODIFY COLUMN) | 0.379817241 |
| P(SATELLITE HUB \| ALTER TABLE ADD COLUMN) | 0.859155598 |
| P(SATELLITE HUB \| ALTER TABLE DROP COLUMN) | 0.823826756 |
| P(SATELLITE HUB \| ALTER TABLE MODIFY COLUMN) | 0.512577361 |
| P(DIMENSIONAL MODELING \| CREATE TABLE) | 0.567845833 |
| P(SATELLITE HUB \| CREATE TABLE) | 0.919848501 |
| P(DIMENSIONAL MODELING \| CREATE TABLE AND ADD REFERENCE TO FACT ADD NEW COLUMN TO FACT) | 0.644204821 |
| P(SATELLITE HUB \| CREATE TABLE SATELLITE CREATE TABLE HUBADD REFERENCE TO HUB) | 0.499752178 |
| P(LOOKUP \| ALTER TABLE ADD COLUMN) | 0.887746972 |
| P(LOOKUP \| ALTER TABLE DROP COLUMN) | 0.110160309 |
| P(LOOKUP \| ALTER TABLE MODIFY COLUMN) | 0.745674878 |
| P(TRANSACTION \| ALTER TABLE ADD COLUMN) | 0.847155229 |
| P(TRANSACTION \| ALTER TABLE DROP COLUMN) | 0.344271075 |
| P(TRANSACTION \| ALTER TABLE MODIFY COLUMN) | 0.813656649 |
| P(NA \| CREATE TABLE) | 0.657539559 |
| P(LOOKUP \| CREATE TABLE AND ADD REFERENCE TO FACT ADD NEW COLUMN TO FACT) | 0.502031423 |
| P(LOOKUP \| CREATE TABLE SATELLITE CREATE TABLE HUBADD REFERENCE TO HUB) | 0.128328243 |
| P(ADD COLUMN \| ALTER TABLE ADD COLUMN) | 0.848710879 |
| P(DELETE COLUMN \| ALTER TABLE DROP COLUMN) | 0.433215448 |
| P(MODIFY COLUMN \| ALTER TABLE MODIFY COLUMN) | 0.972117672 |
| P(ADD NEW SOURCE \| CREATE TABLE) | 0.909349441 |
| P(ADD NEW SOURCE \| CREATE TABLE AND ADD REFERENCE TO FACT ADD NEW COLUMN TO FACT) | 0.00760682 |
| P(ADD NEW SOURCE \| CREATE TABLE SATELLITE CREATE TABLE HUBADD REFERENCE TO HUB) | 0.910130715 |

FIG. 5B

| OUTCOME | PROBABILITY VALUE |
|---|---|
| P(ALTER TABLE ADD COLUMN \| INPUT COLUMNS) | .032 |
| P(ALTER TABLE DROP COLUMN \| INPUT COLUMNS) | .412 |
| P(ALTER TABLE MODIFY COLUMN \| INPUT COLUMNS) | .01 |
| P(CREATE TABLE \| INPUT COLUMNS) | .021 |
| P(CREATE TABLE AND ADD REFERENCE TO FACT ADD NEW COLUMN TO FACT \| INPUT COLUMNS) | .111 |
| P(CREATE TABLE SATELLITE CREATE TABLE HUB ADD REFERENCE TO HUB \| INPUT COLUMNS) | .045 |

FIG. 5C

AUTONOMOUS DECISION SUPPORT SYSTEM USING CONFIGURATION INFLATION BASED ETL AND CONTENT MODELING

TECHNICAL FIELD

The present disclosure relates to decision support systems (DSSs), and more particularly to automatically updating a DSS based on a detected change in a set of data sources of the DSS.

BACKGROUND

A decision support system (DSS) is a computer-based information system that supports business or organizational decision-making activities. DSSs can serve the management, operations, and planning levels of an organization (usually mid and higher management) and help to make decisions, which may be rapidly changing and not easily specified in advance. One example DSS is CLARITY from CA TECHNOLOGIES. DSSs often have a business intelligence (BI) component which contains BI rules to help with the decision making.

A DSS includes a data warehouse, one or more semantic layers, and a presentation layer. The data warehouse includes data aggregated from a number of data sources. Most DSSs typically consist of one or many data warehouses for the backend and one or many BI frontends. The data warehouses are used to consolidate data from a set of one or multiple sources over a long period of time transformed to be optimized for quick retrieval. The BI frontend(s) may be used to enable data visualization, analysis, self-service, data broadcast, sandboxing, etc.

Data may be imported into the data warehouse from the data sources via an Extract, Transform, Load (ETL) tool, for example. An ETL engine may extract data from various data sources, transform the data for storage in a proper format and/or structure for querying and analysis, and load the data into its final target in the data warehouse.

The semantic layer is a business translation layer that sits between the data warehouse and end users. The semantic layer acts as a translator of sorts by mapping complex metadata (e.g., data types and names of fields) from the data warehouse to business intelligence (BI) software fields in a way that business users can understand and utilize. Because BI software fields are more understandable by business users, the semantic layer isolates business users from the technical complexities of the data warehouse. By using common business terms, rather than data language, the semantic layer makes it easier for business users to access, manipulate, and organize information, and simplifies the complexity of business data. The presentation layer (which may be part of a BI frontend) creates BI output based on the BI fields in the semantic layer, such as charts, reports, dashboards, etc.

SUMMARY

According to one aspect of the present disclosure, a computer-implemented method is disclosed which detects a change in a set of data sources of a decision support system (DSS). The change comprises addition of a new data source to the set, removal of an existing data source from the set, or a schema change of an existing data source in the set. A first set of DSS updates for pending extract, transform, load (ETL) jobs of an ETL engine of the DSS are automatically determined based on the change in the set of data sources. The pending ETL jobs import data from the set of data sources into a data warehouse. The computer implementing the method automatically updates, without canceling, the pending ETL jobs of the ETL engine based on the first set of DSS updates. A second set of DSS updates for a semantic layer of a business intelligence (BI) engine of the DSS are automatically determined based on the change in the set of data sources and based on the first set of DSS updates. The semantic layer comprises a mapping of fields from the data warehouse to reporting fields of the BI engine. The semantic layer of the BI engine is automatically updated based on the second set of DSS updates.

According to another aspect of the present disclosure, a computing device is disclosed that comprises a communication interface and a processing circuit. The communication interface is configured to communicate with an ETL engine of a DSS, a BI engine of the DSS, or both the ETL engine and the BI engine. The processing circuit is communicatively connected to the communication interface and is configured to detect a change in a set of data sources of the DSS, with the change comprising addition of a new data source to the set, removal of an existing data source from the set, or a schema change of an existing data source in the set. The processing circuit is further configured to automatically determine a first set of DSS updates for pending ETL jobs of the ETL engine based on the change in the set of data sources, wherein the pending ETL jobs import data from the set of data sources into a data warehouse. The processing circuit is further configured to automatically update, without canceling, the pending ETL jobs of the ETL engine based on the first set of DSS updates. The processing circuit is further configured to automatically determine a second set of DSS updates for a semantic layer of the BI engine based on the change in the set of data sources and based on the first set of DSS updates, wherein the semantic layer comprises a mapping of fields from the data warehouse to reporting fields of the BI engine. The processing circuit is further configured to automatically update the semantic layer of the BI engine based on the second set of DSS updates.

According to another aspect of the present disclosure, a computer program product is disclosed which comprises a computer readable storage medium having computer readable program code embodied therewith. The computer readable program code comprises computer readable program code configured to detect a change in a set of data sources of a DSS, the change comprising addition of a new data source to the set, removal of an existing data source from the set, or a schema change of an existing data source in the set. The computer readable program code further comprises computer readable program code configured to automatically determine a first set of DSS updates for pending ETL jobs of an ETL engine of the DSS based on the change in the set of data sources, wherein the pending ETL jobs import data from the set of data sources into a data warehouse. The computer readable program code further comprises computer readable program code configured to automatically update, without canceling, the pending ETL jobs of the ETL engine based on the first set of DSS updates. The computer readable program code further comprises computer readable program code configured to automatically determine a second set of DSS updates for a semantic layer of a BI engine of the DSS based on the change in the set of data sources and based on the first set of DSS updates, wherein the semantic layer comprises a mapping of fields from the data warehouse to reporting fields of the BI engine. The computer readable program code further comprises computer readable program code configured to automatically update the semantic layer of the BI engine based on the second set of DSS updates.

Of course, the inventive embodiments of the present disclosure are not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 5A-C illustrate an application of a case-based AI model.

DETAILED DESCRIPTION

Figure 1:
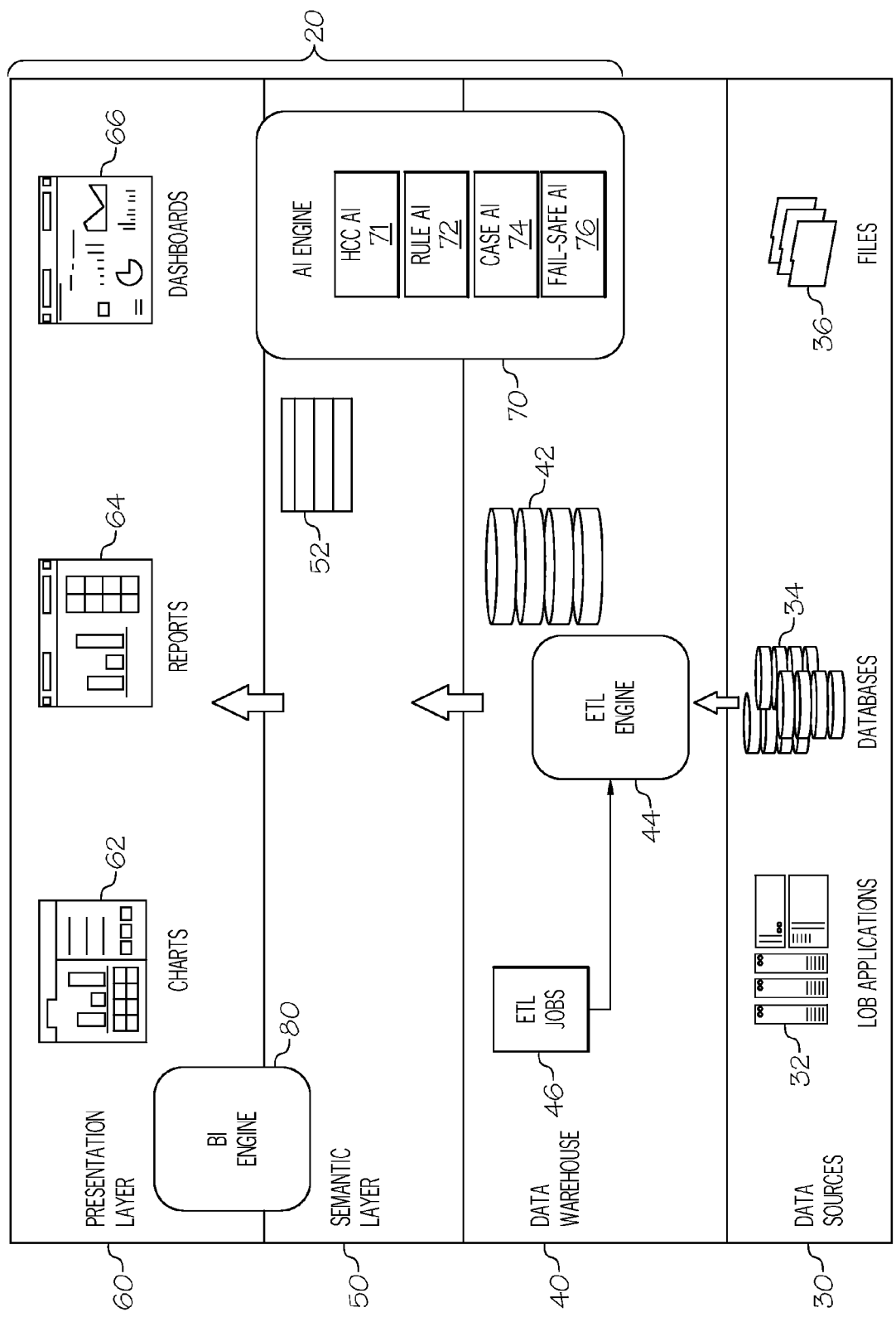
FIG. 1 illustrates the functional components of an example DSS, including an artificial intelligence (AI) engine.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In the past, configuration of a DSS has been quite costly and time-consuming. Even after a DSS was configured, support, maintenance, and enhancement of the DSS could be a costly affair. Enhancements to DSSs tend to fall mostly in areas such as source system changes (e.g., addition of new data sources, addition/modification of business logic, addition/modification of BI components like semantic layers, dashboards, reports or similar requirements, etc.). This resulted in DSS users being heavily reliant on software service providers and consultants to make any system changes. Another issue is that the production life of many DSSs was shorter than their respective development/enhancement cycles. By the time a DSS was developed, there may be a need to update the data sources of the DSS, which can lead to another prolonged development cycle. These problems were amplified by the fact that DSSs are rigid, in that changes in source schema like new table additions are often rejected or not gracefully handled. As a result, modifications to source schema could cause catastrophic system failure. Hence, upgrades, enhancements and modifications to the Decision Support Systems were costly, slow and risky in terms of cost, effort and ROI The present disclosure describes implementation of automatic updates for a DSS based upon changes in the data sources of the DSS. These automatic updates include automatically updating, without canceling, pending DSS updates of an ETL engine of the DSS, as well as automatically updating a semantic layer of the DSS. The automatic updates are determined using artificial intelligence (AI) models that determine desired DSS updates based on the data source changes and/or based on analysis of historical DSS updates performed for previous changes to the data sources of the DSS (e.g., through a supervised learning AI algorithm). The change to the data sources does not refer, e.g., to adding new records to an existing table, but instead refers to addition of a new data source, removal of an existing data source, or a schema change of an existing data source.

The automatic updates that are performed may depend on a confidence metric determined for a given update. If a value of the confidence metric is too low, additional/alternative DSS updates may be determined. The confidence metric is more likely to be lower where the changes to the data sources of the DSS are not reflected in historical data for the DSS. In various ones of the embodiments discussed below, an ETL engine of the DSS uses a configuration inflation mode of operation based on instructions contained in XML files to implement the automatic updates. These automatic updating features can be used to provide an autonomous, adaptable, intelligent, resilient, self-governing DSS. In one or more embodiments, the DSS uses configuration inflation based ETL, and also uses BI content modeling via APIs to provide such benefits. This could include custom BI APIs, or out of the box BI APIs supported by leading BI software such as COGNOS, BUSINESS OBJECTS, JASPER, PENTAHO BI, etc.

This can impart an autonomous/self-governing/adaptability to a DSS. This can also cut down the time to upgrade, modify, and enhance the DSS and significantly reduce risks, costs, and effort, which can increase the life of a DSS. Also, the same behavior can make it simpler for layperson users to manage the DSS, reducing the need for hiring a team of DSS administration experts.

With this in mind, FIG. 1 illustrates an example DSS 20 that imports data from a set 30 of data sources into a data warehouse 40. The set 30 may include data sources such as Line of Business (LOB) applications 32, databases 34, and/or individual files 36. The data sources in the set 30 could include a plurality of tables containing data (e.g., transaction tables, dimension tables, lookup tables, etc.), for example. An ETL engine 44 provides Extract, Transform, Load (ETL) functionality and is used to import data from the set 30 of data sources into the data warehouse 40 that includes a data repository 42. The term "data warehouse" is intended to broadly cover a group of one or more databases (and thus, is intended to cover so-called "data marts"). Additionally, although data warehouse is used in the singular form, it is understood that the DSS 20 could include multiple data warehouses for which the techniques below could be applied.

The ETL engine 44 extracts data from various data sources, transforms the data for storage in a proper format and/or structure for querying and analysis, and loads the data into its final target in the data warehouse. The ETL engine 44 performs these tasks based on a series of ETL jobs 46 that instruct the ETL engine 44 on how the data from the set 30 of data sources should be processed. In some embodiments, a given ETL job may include a plurality of ETL transformations that are grouped together. The ETL engine 44 handles data warehouse population for the DSS 20. The ETL jobs 46 performed by the ETL engine 44 comprise one or more configuration files (e.g., XML configuration files).

As an example of ETL engine 44 operation, consider that a data source may include raw data for hundreds or thousands of customer orders, with each order including price and customer information. In one example, the ETL engine 44 may group orders by some criteria (e.g., group all orders from a given customer, or by customers in a given geographical region), determine a sum of the orders by that criteria (e.g., total amount spent by the customer, or by customers in the geographical region), and then create or update a table in the data warehouse 40 to reflect that aggregated information. A pending ETL job may be executed periodically (e.g., to update the aggregated table based on newly placed orders). The semantic layer 50 maps fields from such a table to BI fields, and the presentation layer 60 may generate reports based on that information (e.g., a report of purchases from customers in a given geographical region over time).

The ETL engine 44 operates based on instructions included in its ETL jobs 46, which indicate what data to extract from sources, how to transform that data, and how to load that data into the data warehouse 40. In one or more embodiments, the ETL engine 44 is a configuration inflation based ETL engine whose operation is based on configuration files that are formatted according to open standards (e.g., XML). In such embodiments, ETL jobs 46 are stored in one or more configuration files, and the ETL engine 44 processes its corresponding configuration file(s) to build runtime code for execution of a given task. In particular, when the ETL engine 44 is executing its ETL jobs, the ETL engine 44 would compile and/or inflate its configuration file(s) (from its ETL jobs 46) into runtime code for execution. The open source ETL engine from PENTAHO, as an example, compiles/inflates its jobs into JAVA runtime code. In these and other embodiments, the AI engine 70 of the DSS can modify the ETL jobs 46 of the ETL engine 44 dynamically, optionally during runtime of the ETL engine 44, by modifying the configuration files of the ETL jobs 46. These automatic updates may be performed in a "silent mode" with no human interaction.

In such embodiments, the ETL engine 44 (which may either be custom built ETL Engine or a third party ETL tool) uses an open standard compliant configuration file inflation based operation and leverages the fact that the ETL jobs 46 can be changed at runtime to adapt to the changes in the source systems in a silent-mode of operation without any human intervention by the AI engine 70. The AI engine 70 could be a separate from the ETL engine 44 and BI engine 80, or could combined with one of the ETL engine 44 or BI engine 80, for example.

Of course, although XML is mentioned above, it is understood that this is a non-limiting example, and that other types of markup languages (or even text files) could be used for ETL engine 44 configuration files. Some third party ETL tools that could be used as the ETL engine 44 include the one from PENTAHO (mentioned above), and one from JASPER REPORTS. Alternatively, a custom built ETL engine 44 could be used.

The DSS 20 also includes one or more semantic layers 50 each comprising a respective mapping 52 of fields from the data warehouse 40 to business intelligence (BI) reporting fields. Presentation layer 60 creates BI output based on the BI fields in the semantic layer(s), such as charts 62, reports 64, and dashboards 66. The DSS also includes the AI engine 70 and a BI engine 80. Although the singular term "semantic layer" is used below, it is understood that a DSS 20 may include a plurality of semantic layers, and that the semantic layer updates described below may be performed for multiple semantic layers of a given DSS in some embodiments.

The AI engine 70 is a software program that manages the sequence of actions to take while the DSS 20 is under operation. This includes handling what operations need to be done for various changes to the set 30 of data sources. The AI engine 70 includes a plurality of AI models. In particular, it includes a secondary AI model (i.e., fail-safe AI model 76), and a primary AI model (e.g., one of a hard coded construct (HCC) AI model 71, a rule-based AI model 72, or a case-based AI model 74). Which of the AI models 71, 72, 74 is used by the AI engine 70 as the primary AI model may depend on the complexity of the DSS 20 being built. For a simple DSS implementation where the number of data sources in the set 30 is low and all the upgrades to the source schema follow fixed rules, the AI engine 70 may use the HCC AI model 71, which may include relatively simple if-then statements. One example HCC could correspond to IF a new table is added to one of the data sources 30, THEN copy the new table in its entirety to the data warehouse 40 AND in a dimension table in the data warehouse 40 that corresponds to the new table include a reference key column for the new table.

In the case of a more complex DSS 20, the AI engine 70 would also need to be more complex, and to include more involved AI features such as supervised learning algorithms that are trained on patterns of changes to the sources, addition of new sources, etc. In these more complex cases, a rule-based AI model 72 or a case-based AI model 74 is more likely to be needed.

As an illustrative example of AI models, consider a weather prediction model. Assume that there are three possible weather predictions that can be predicted: sunshine, rain, or snow. Assume that the inputs to the model include temperature, wind speed, and humidity. If one wanted to write AI for a single city, one could generalize relatively easily and create a few IF THEN ELSE statements to predict the output. For the single city example, the HCC AI model 71 could be appropriate because the outcomes and the inputs have very fixed possibilities. However, if one wanted to write an AI for a country or the entire world, then there would be a very large number of input possibilities. In such cases, it is not humanly possible to generalize a few IF THEN ELSE statements. In these cases a supervised learning model would be more appropriate, as it could be trained over the input samples and based on that training a program could be built that provide predictions. Whether to use the rule-based AI model 72 or the case-based AI model 74 is dependent on the skew in the input sample data. Rule-based models are weak against skew but run faster, whereas case-based models are robust in skewed conditions but perform slowly. "Skew" in this context refers to a disparity in the quantity of various types of historical data. Using the weather example above, if there were thousands of cases of sunshine and rain but only a handful of cases of snow that would be considered skew.

Referring again to FIG. 1, the BI engine 80 handles data visualization, data retrieval, data querying, and data security aspects of the DSS 20. The BI engine 80 can be a custom application, or can be based on commercially available software like SAP BUSINESS OBJECTS, JASPER REPORTS, etc., which expose BI APIs that can be used by the AI engine 70 to alter/enhance BI content. As an illustrative example of how business logic could be applied to data in the data warehouse 40, in some embodiments business logic could be used to transform source transactional data into aggregated data (e.g., individual sales invoices could be aggregated to monthly sales for a plurality of sales locations).

The presentation layer 60 includes an associated user interface (UI) frontend that enables layperson users to administer/manage the DSS 20 without the need for BI or ETL subject matter expert (SME) teams. Since the DSS 20 updates itself automatically and autonomously based on changes to its set 30 of data sources, users may not agree with the automatic updates. In one or more embodiments, the UI enables users to command/override the behavior of the AI engine 70 by rolling back or modifying changes that were automatically made. For example, addition of a new key performance indicator (KPI) measure would give users an option of specifying whether it is an additive/semi-additive/non-additive measure and the AI engine 70 will carry out the next steps for population to the data warehouse 40. For example, if a new column is added to one of the data sources, and the AI engine 70 correspondingly creates a new KPI for that measure that sums an item from the column, a user may choose to override that determination to an average instead of a sum. Users can manually override/command the AI engine 70 to correct such mistakes. The UI frontend makes the DSS 20 easier to manage such that even layperson users can administer aspects of the DSS 20.

The AI engine 70 keeps track of changes that are made in the data warehouse 50 (via the ETL engine 44) and translates those changes into relevant API calls to update the semantic layer 50 and possibly also BI content of the presentation layer 60. This can make BI content resilient with respect to data warehouse 40 and data source updates. This entails automatic modeling of the semantic layer 50, and making newly-added fields reportable in the semantic layer 50. The automatic modeling of the semantic layer 50 involves including newly added fields and tables to the semantic layer 50, so that they are referenced automatically. The term "automatic modeling" refers to automatically resolving the relationships and cardinality of the new fields, which in the prior art has been performed through manual examination of the logical schema of a given data source. Making the new fields reportable involves making the fields available for the customers to create reports (in presentation layer 60) out of the semantic layer 50 for ad hoc reporting purposes. In some embodiments, existing reports also can be automatically modified to include the fields that are added/deleted/modified by the changes done in a changed data source.

In prior art ETL systems, minor changes to data sources could cause a variety of problems. For example, assume that one of the data sources in the set 30 included a table "PROJECT_TABLE" having the following fields:
Project ID
Project Name
Start Date
End Date
Financial Status
Department
Location
508 Compliance As part of this example, assume that the field "508 Compliance" was deleted from the data source in question. In the prior art, without the intervention of an ETL expert to reconfigure pending ETL jobs, this change could cause ETL logic in a pending ETL job to fail, such that no ETL jobs would run at all, and data in the DSS would quickly become stale.

As another example, assume that there is a legal mandate on an organization to add a new field named "HIPAA_COMPLIANCE_STATUS" on all projects that are being executed. If this field was added to the data sources of a DSS, but pending ETL jobs were not configured to address it, then the data of this field would be omitted from the data warehouse 40 entirely in the prior art.

The improved DSS 20 disclosed herein responds automatically to changes to its data sources by updating its ETL engine 44 and semantic layer 50. In one example, if a new data source is added to the set 30, the AI engine 70 checks the metadata of the updated data source either from a configuration table or by settings in a UI of the DSS to understand what changed in the schema of the source, and starts updating the data warehouse 40 based on predefined rules set to handle new data source additions. The AI engine 70, upon detecting a new source, will make changes to the ETL jobs 46 or create new ETL jobs 46 to update the data warehouse 40. After this, the AI engine 70 could make corresponding changes to the semantic layer 50 and optionally also the presentation layer 60 by passing instructions to the BI engine 80.

In another example, if a data source is removed from the set 30 of data sources, the AI engine 70 would implement the appropriate set of operations to unhook the mappings between the dropped data source and the data warehouse 40 by passing instructions to the ETL engine 44 or directly modifying the ETL jobs 46 of the ETL engine 44. After this, the AI engine 70 may alter the semantic layer 50 and optionally also the presentation layer 60 by interacting with the BI engine 80.

In another example, assume that a schema of an existing data source changes in that a new column is added. When a new column in a data source is added, the AI engine 70 handles this change by making the appropriate changes to the ETL jobs 46 directly or by passing instructions to the ETL engine 44. The AI engine 70 also updates the data warehouse 40 schema to handle the new additions. The AI engine 70 also updates the semantic layer 50 and optionally also updates BI content of the presentation layer 60 by, e.g., using exposed BI APIs or by sending appropriate instructions to the BI engine 80.

In another example, assume that a schema of an existing data source in the set 30 changes in that an existing column is deleted. When an existing column is dropped, the AI engine 70 will take the necessary steps to modify the ETL jobs 46, data warehouse 40 schema, and optionally also the BI content (e.g., reporting templates) of the presentation layer 60. This can be done directly or indirectly by sending the instructions accordingly to the ETL engine 44 and BI engine 80. If there are changes to the structure of the existing columns, these could be handled in the same way.

In the examples discussed above, and others discussed throughout this application, the presentation layer 60 updates are described as being optional. This is because users may not want their reports automatically updated. For example, reports may still be desired for historic data from a deleted data source. In other instances, such as when a field of a table is modified, then it is more likely that an automatic update of the presentation layer 60 would be desired (e.g., of the reporting templates that provide the charts 62, reports 64, and/or dashboards 66 for displaying BI content).

Figure 2:
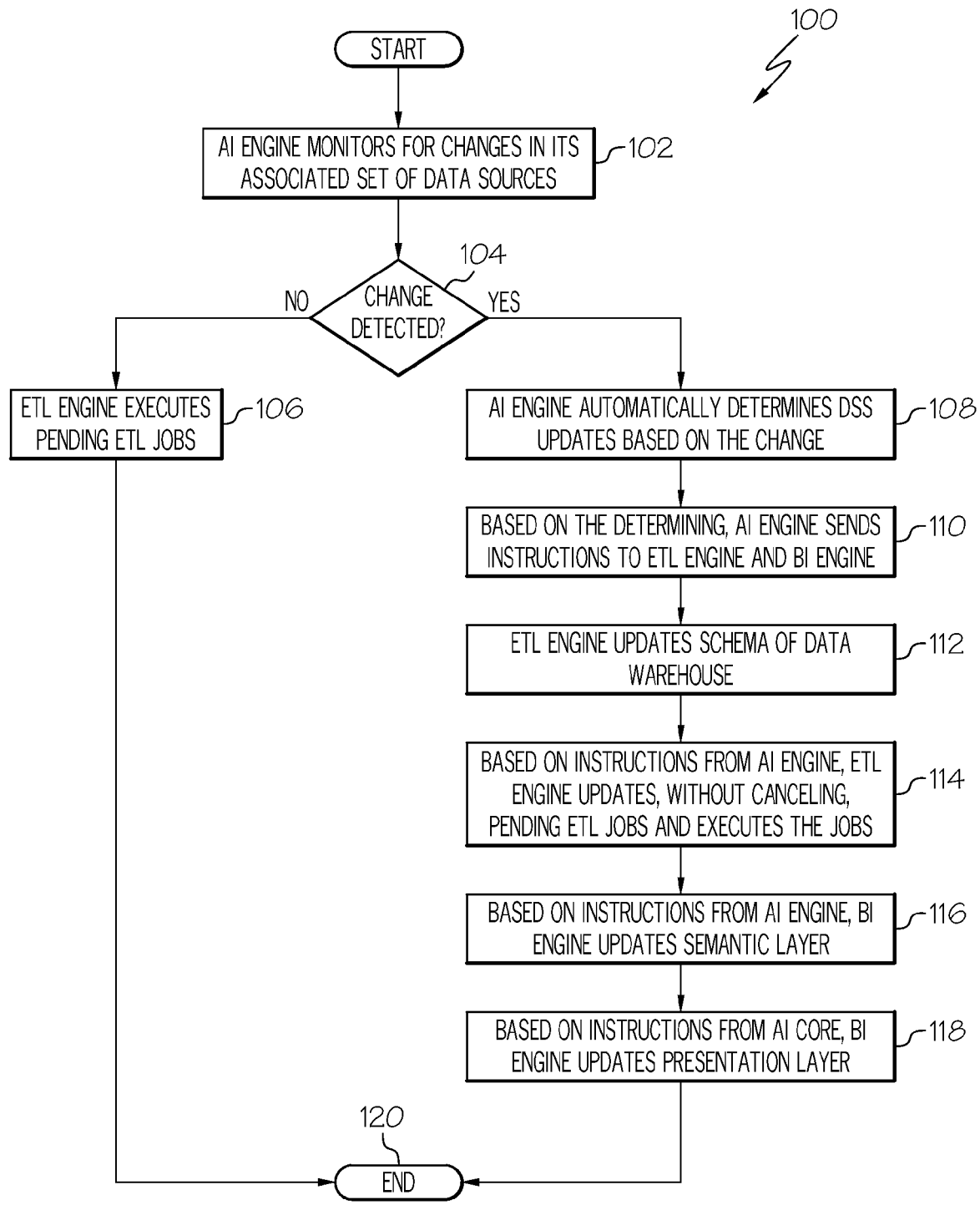
FIG. 2 illustrates an example method for automatically updating a DSS based on a detected change in a set of data sources of the DSS.

FIG. 2 illustrates an example method 100 for automatically updating a DSS 20 based on a detected change in a set 30 of data sources of the DSS 20. The AI engine 70 monitors for changes in its associated set 30 of data sources (block 102). This could correspond to an active monitoring (e.g., periodic parsing metadata of the set 30 of data sources), or could correspond to a passive monitoring (e.g., waiting to receive a change notification from a monitoring agent). The change could include addition of a new data source to the set 30, removal of an existing data source from the set 30, or a schema change of an existing data source in the set 30, for example.

If no change is detected (a "No" to block 104), then the ETL engine 44 executes its ETL jobs 46 without updating the ETL jobs 46 (block 106). However, if a change is detected by the AI engine 70 (a "Yes" to block 104"), then the AI engine 70 automatically determines DSS updates to implement based on the detected change (block 108). Based on this determining, The AI engine 70 sends instructions to the ETL engine 44 and the BI engine 80 (block 110). The ETL engine 44 receives its instructions, and correspondingly updates a schema of the data warehouse 40 (block 112). The schema update could include the ETL engine 44 executing Data Definition Language (DDL) commands, for example.

Based on the instructions received from the AI engine 70, the ETL engine 44 updates, without canceling, it pending ETL jobs 46 and then executes the ETL jobs 46 (block 114). In an alternate embodiment, the AI engine 70 could directly modify the ETL jobs 46 instead of doing so indirectly via the ETL engine 44. The BI engine 80, based on its instructions from AI engine 70, updates the semantic layer 50 (block 116), and updates the presentation layer (block 118). These updates are automatically performed so that the DSS 20 can dynamically update itself based upon changes to its set 30 of data sources. In some embodiments, the update of the semantic layer 50 and/or presentation layer 60 is performed by using the exposed APIs of the BI engine 80 of the DSS 20. Unlike the prior art, where a data source update could cause a DSS to omit data or simply stop operating, the method 100 of FIG. 2 implements dynamic DSS updates to avoid these issues.

Figure 3:
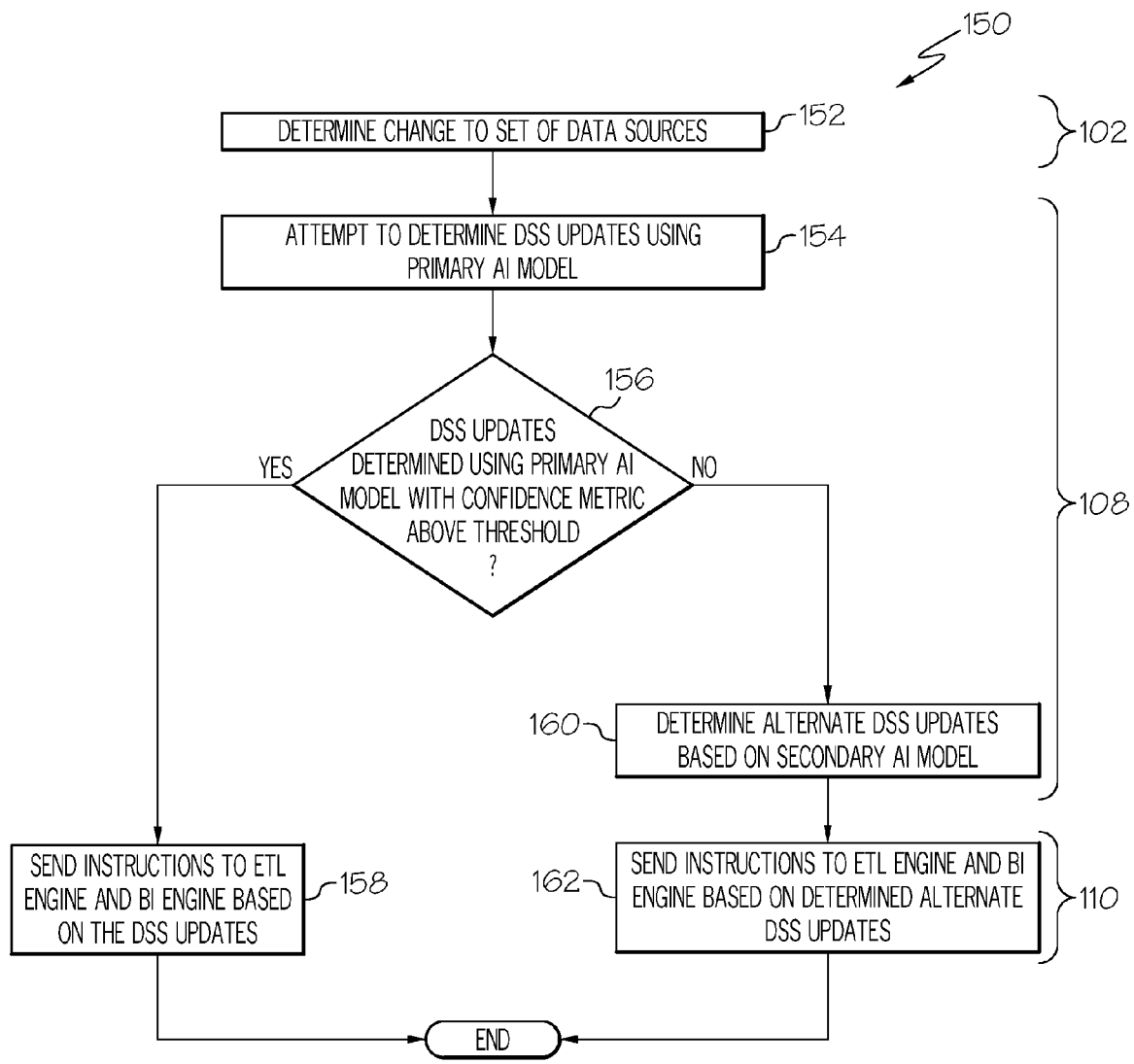
FIG. 3 illustrates a method which incorporates aspects of the method of FIG. 2.

FIG. 3 illustrates an example method 150 which incorporates aspects of the method 100 of FIG. 2. In particular, FIG. 3 illustrates example implementations of blocks 102-

110 of FIG. 3 (see notation along right side of FIG. 3). The method 150 of FIG. 3 is implemented by the AI engine 70. The AI engine 70 determines a change to the set 30 of data sources (e.g., addition of a data source to the set 30, removal of an existing data source in the set 30, and/or a schema change of an existing data source in the set 30) (block 152). Based on the determined change, the AI engine 70 attempts to determine DSS updates using a primary AI model (e.g., AI model 71, 72, or 74) (block 154). If that attempt is successful and updates are determined using the primary AI model which have a confidence metric above a predefined threshold (a "Yes" to block 156), the AI engine 70 sends DSS update instructions to the ETL engine 44 and BI engine 80 based on the determined changes (block 158). Otherwise, if updates cannot be determined using the primary AI model, or if updates are determined but they have a confidence metric that is below the predefined threshold (a "No" to block 156), then the AI engine 70 determines alternate DSS updates using a secondary AI model (the fail-safe AI model 76) (block 160), and sends corresponding DSS update instructions to the ETL engine 44 and BI engine 80 based on the alternate DSS updates (block 162).

To determine potential DSS updates (block 154), the hard coded construct (HCC) AI model 71, rule-based AI model 72, or case-based AI model 74 will be used. These AI models are trained on data related to the most common or expected data sources. The HCC AI model 71 (which uses programming logic in place of supervised learning algorithms) is most useful in data warehouses where the range of changes is finite and known. This is most useful for smaller and/or simpler data warehouses where the sources are fixed and only minimalistic changes are expected. The HCC AI model 71 can work very well with single source data warehouses (e.g., such as the one used by "CA PPM," formerly known as "CA CLARITY PPM," from CA TECHNOLOGIES).

In data warehouses that include data from a single data source, the customizations that customers may implement are more predictable, which lends itself well to the rule-based and/or case-based AI models 72, 74. For example, if the data warehouse 40 uses a "dimensional" data model and a new attribute is added on the table "investment", then a rule or case could add that attribute to all the investment-related dimensions. As another example, if the data warehouse 40 uses a satellite-hub data model and a new column is being added to table "SRM_RESOURCES," then it is likely that this new column should go to the satellite of the hub that contains a RESOURCE_ID from past cases for the DSS 20 (where the RESOURCE_ID is a unique identifier for the SRM_RESOURCES table in the source database). In some instances, as discussed above, rules and/or cases can be hardcoded for simpler data warehouse 40 using the HCC AI model 71.

An example implementation of blocks 154 and 164 of the method 150 will now be discussed in which the primary AI model is the rule-based AI model 72. For this discussion, assume that a new field named "HIPAA_COMPLIANCE_STATUS" has been added to a table named "PROJECT_TABLE" in one of the data sources in the set 30. The AI engine 70 detects this change to the set 30 of data sources (block 152), and based on that detection attempts to determine DSS updates using the rule-based AI model 72 (block 154). In particular, the AI engine 70 determines whether it has a corresponding rule that applies to the change. This determination may be based, for example, on any combination of the following criteria:

a data model of the data source containing "PROJECT_TABLE" (e.g., satellite hub modeling or dimension modeling);

a table type of "PROJECT_TABLE" (e.g., transaction or lookup);

a change made to the data source containing "PROJECT_TABLE" (e.g., table addition, table deletion, or table modification);

a data type of a field that was added (e.g., decimal, string, etc.); and a parent table of "PROJECT_TABLE"

Of course, it is understood these are only example criteria could be used, and that alternate criteria could also be used.

Some example rules for the rule-based AI model 72 are shown in tables 1-4 below. In these example rules, the symbol "II" represents concatenation, and "DWH" refers to the data warehouse 40.

TABLE 1

| | |
|---|---|
| Criteria | If table_type = "lookup" and data_type = "String" and source_change = "column added" and data_model = "Dimensional" then |
| ETL Engine Instructions | "ALTER TABLE" \|\| "DWH_DIM_" \|\| parent_table \|\| "ADD COLUMN" \|\| "DWH_" \|\| column_name \|\| " " \|\| data_type \|\| ";" Update ETL Job to add the source to target mappings parent_table.column_name = "DWH_DIM_ "\|\|parent_table\|\| "."\|\|"DWH_"\|\|column_name |
| BI Engine Instructions | Search all semantic layers using table "DWH_DIM_" \|\| parent_table and update all references with the new column "DWH_" \|\|column_name Search all reports/dashboards using majority of columns from "DWH_DIM_"\|\| parent_table and update all references with the new column "DWH_"\|\|column_name |

TABLE 2

| | |
|---|---|
| Criteria | If table_type = "transaction" and data_type = "decimal" and source_change = "column deleted" and data_model = "Dimensional" then |
| ETL Engine Instructions | "ALTER TABLE" \|\| "DWH_FACT_" \|\| parent_table \|\| "DROP COLUMN" \|\| "DWH_" \|\| column_name \|\| " " \|\| data_type \|\| ";" Update ETL Job to remove the source to target mappings parent_table.column_name = "DWH_FACT_ "\|\|parent_table\|\|"."\|\|"DWH_"\|\|column_name |
| BI Engine Instructions | Search all semantic layers using table "DWH_FACT_" \|\| "parent_table" and remove all references with the deleted column "DWH_" \|\|column_name Search all reports/dashboards using the deleted column from "DWH_FACT_"\|\| "parent_table" and remove the column "DWH_" \|\|column_name |

Tables 3-4 below illustrate additional example rules for the rule-based AI model 72. In particular, Table 3 illustrates the rule of Table 1 applied to the addition of "HIPAA_COMPLIANCE_STATUS" in which the DSS 20 uses a "dimensional" data model, and Table 4 applies to the addition of "HIPAA_COMPLIANCE_STATUS" in which the data warehouse 40 uses a "satellite hub" data model.

TABLE 3

| Criteria | If table_type = "lookup" and data_type = "String" and source_change = "column added" and data_model = "Dimensional" then |
|---|---|
| ETL Engine Instructions | "ALTER TABLE" \|\| "DWH_DIM_" \|\| "PROJECT" \|\| "ADD COLUMN" \|\| "DWH_" \|\| "hipaa_compliance_status" \|\| " " \|\| "VARCHAR(100)" \|\| ";" Update ETL Job to add the source to target mappings parent_table.column_name = "DWH_DIM_ "\|" PROJECT" \|"."\|"DWH_"\|"hipaa_compliance_status" |
| BI Engine Instructions | Search all semantic layers using table "DWH_DIM_" \|\| "PROJECT" and update all references with the new column "DWH_"\|"hipaa_compliance_status" Search all reports/dashboards using majority of columns from "DWH_DIM_" \|\| "PROJECT" and update all references with the new column "DWH_"\|"hipaa_compliance_status" |

TABLE 4

| Criteria | If table_type = "lookup" and data_type = "String" and source_change = "column added" and data_model = "Satellite_Hub" then |
|---|---|
| ETL Engine Instructions | "ALTER TABLE" \|\| "DWH_HUB_" \|\| "PROJECT" \|\| "ADD COLUMN" \|\| "DWH_" \|\| "hipaa_compliance_status" \|\| " " \|\| "VARCHAR(100)" \|\| ";" Update ETL Job to add the source to target mappings parent_table.column_name = "DWH_HUB_ "\|" PROJECT" \|"."\|"DWH_"\|"hipaa_compliance_status" ("DWH_HUB"\|"PROJECT"\|"." PROJECT_ID" = "DWH_SATELLITE"\|"PROJECT"\|"." PROJECT_ID") is already internally coded. |
| BI Engine Instructions | Search all semantic layers using table "DWH_HUB_" \|\| "PROJECT" and update all references with the new column "DWH_"\|"hipaa_compliance_status" Search all reports/dashboards using majority of columns from "DWH_HUB_" \|\| "PROJECT" and update all references with the new column "DWH_"\|"hipaa_compliance_status" |

If a matching rule is determined using the rule-based AI model 72, the AI engine 70 would send instructions to the ETL engine 44 and BI engine 80 based on the DSS updates (block 164). In particular, the AI engine 70 would instruct the ETL engine 44 to:

update, without canceling, its pending ETL jobs 46 that import data from "PROJECT_TABLE" to also include "HIPAA_COMPLIANCE_STATUS;" and update the data warehouse 40 so that tables including data from "PROJECT_TABLE" also include "HIPAA_COMPLIANCE_STATUS."

The AI engine 70 would send instructions to the BI engine 80 by invoking BI engine APIs which instruct the BI engine 80 to:

update semantic layer 50 so that "HIPAA_COMPLIANCE_STATUS" in the data warehouse 40 is mapped to a BI field available to BI users; and update reports that include data from "PROJECT_TABLE" to also include "HIPAA_COMPLIANCE_STATUS."

Figure 4:
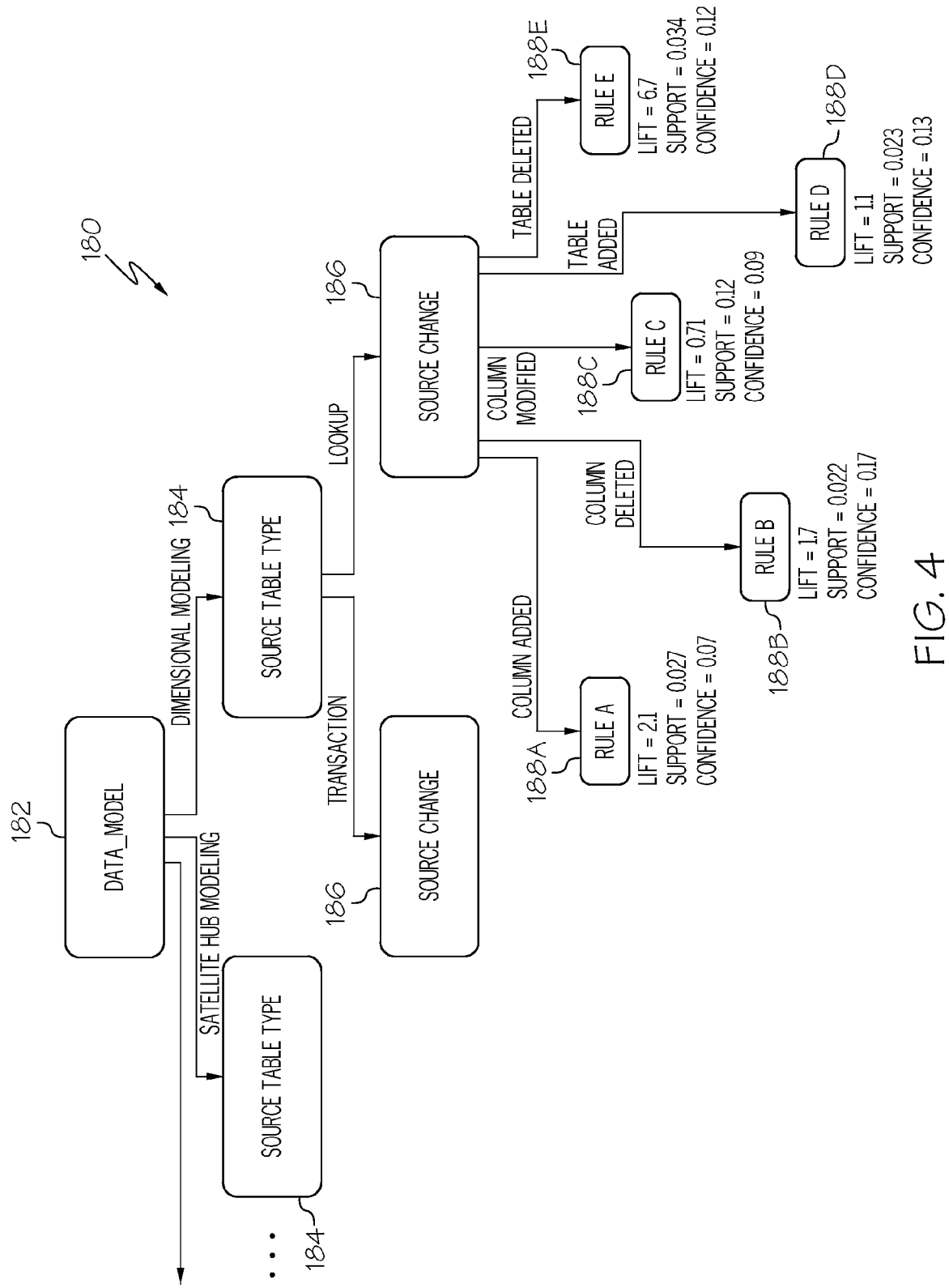
FIG. 4 illustrates an example decision tree for the AI engine of FIG. 1.

In some embodiments of the AI engine 70, a decision tree is used to assist in the determining of which rule to apply in the rule-based AI model 72 based on the criteria for rule selection (e.g., table type, data type, source change, data model). FIG. 4 illustrates an example decision tree that incorporates the following criteria: data model (182), source table type (184), and source change (186). If the data model is "dimensional," and the source table type is "lookup," a plurality of specific rules 188A-E are mapped to the different types of source changes 186. Each rule may have an associated lift, support, and confidence value. To use the analogy of the weather prediction model, "support" could refer to how many cases were available, "confidence" could refer to how many times a given set of input values resulted in snow, and "lift" could be indicative of data skew (i.e., one outcome having considerably less cases than other outcomes). Although not shown, rules of the rule-based AI model 72 could also be mapped to the other source changes and table types.

Hardcoded rules in the HCC AI model 71 are generally used in simpler DSS implementations. In such implementations, the rules could be either coded (e.g., as JAVA or C control structures or could be maintained in a table, for example. For a supervised learning algorithm (e.g., the rule-based AI model 72), rules may be made available as a decision tree (see FIG. 4). For the case-based AI model 74, outcomes may be decided using a Naïve Bayes algorithm or k-nearest neighbor algorithm, for example. A difference between supervised learning algorithms (e.g., rule-based and case-based) and the HCC AI model 71 is that the supervised learning algorithms are trained on historical data, whereas the hard coded constructs of the HCC AI model 71 are encoded manually based on experience and known aspects of the data warehouse 40 and its set of data sources 30. Manual updates to the HCC AI model 71 could be performed base on user feedback to add/correct the HCC model's rules, whereas updates to the supervised learning algorithms would be more automated.

Referring again to FIG. 3, an example implementation of blocks 158-162 and 166-168 of the method 150 will now be discussed in connection with the case-based AI model 74 and the fail-safe AI model 76. The case-based AI model 74 uses case-based reasoning. It contains a case history and "feature set" based on historical DSS updates and the attributes of the set 30 of data sources (e.g., tables, columns, etc.). The feature set serves as criteria for case selection in the case-based AI model 74 and could include, for example, any combination of the following:

data type of column;
table of the column
"Is Indexed" flag;
"Is Foreign Key" flag;
"Is Primary Key" flag;
usage pattern Of course, these are only example criteria, and it is understood that other criteria could be used.

The dependent variable of the case-based or rule-based AI model is the change that needs to be implemented in the data warehouse 40 (e.g., add/alter/drop from dimension/fact/satellite/hub tables). The final dependent variable is chosen based on a confidence metric that represents the support for a given case (see block 156 in FIG. 3). The confidence metric is indicative of how likely it is that the determined outcome is a correct one. For the rule-based AI model 72, the confidence metric may be based on any one of or combination of lift, support, or confidence. For the case-based AI model 74, the confidence metric can be determined based on case probabilities (as discussed below in connection with FIGS. 5A-C). The case-based and rule-based AI models adapt to historical DSS updates, such that when a change is triggered in the data sources, the case-based AI model or rule-based AI model can determine an outcome that has the strongest basis in historical DSS update data (e.g., determining a number of cases that match the change, and selecting an outcome as the dependent variable that has the most occurrences in the matched cases).

FIGS. 5A-C illustrate an example application of a Naïve Bayes case-based AI model. FIG. 5A illustrates a table 200 that lists a plurality of samples 202 of historical DSS update data, each of which has an associated data model 204, source table type 206, source change 208, and output 210 (i.e., DSS update). Using Naïve Bayes techniques, the plurality of cases in the table 200 are converted into a reverse probability table 220 (see FIG. 5B).

The concept of the reverse probability table can be understood in the context of the weather prediction model discussed above. Assume that there are three possible weather outcomes: sunshine, rain, or snow. Also continue to assume that the inputs to the model include temperature, wind speed, and humidity. The reverse probability table 220 could be used to determine the probability of the temperature being "X" when the outcome was snow. In the example of record 222A of FIG. 5B, the reverse probability 0.924908343 indicates the probability of the data model being "dimensional modeling" when the output (column 210 of FIG. 5A) is "alter table add column."

FIG. 5C is derived from FIG. 5B, and illustrates probabilities of given outcomes occurring based on certain inputs. Stated in the context of the weather predictor model, FIG. 5C would indicate the probabilities for: sunshine, rain, or snow occurring. Referring now to the actual data of FIG. 5C, what is shown is the probability of various DSS updates being performed based on a source change of "input columns." The highest probability value is selected (which in this case is 0.412—the second row of FIG. 5C). For the case-based AI model 74, the confidence metric could be a probability value as shown in FIG. 5C, and the threshold to which it is compared could be a probability threshold, for example.

Referring again to FIG. 3, if the case-based AI model 74 or rule-based AI model 72 yields DSS updates having a confidence metric that exceeds the predefined threshold (a "Yes" to block 162), then the DSS updates determined using the case-based AI model 74 or rule-based AI model 72 are implemented (block 164). Otherwise, if the case-based AI model 74 or rule-based AI model 72 yields DSS updates having a confidence metric below the threshold, then the fail-safe AI model 76 is used to determine alternate DSS updates (block 166).

The fail-safe AI model 76 can include hard code constructs and/or may be further based on a supervised learning algorithm (e.g., rule-based or case-based). Which one of the hardcoded construct or a supervised algorithm is used for the fail-safe AI model depends on the possible outcomes. For example, a hardcoded construct based model may be used if one does not want to have varied outcomes based on exceptions. Consider the following example. assume that one does not want to take many actions due to some source changes for which DSS updates determined using the primary AI model yielded a very low confidence metric. If the input change is addition of a table that does not have references in any existing tables in the data warehouse 40, then the fail-safe AI model 76 may use hardcoded constructs to just copy that table as is to the data warehouse 40.

Similarly, if a new source is added which is a folder of flat files, the fail-safe AI model 76 may try to parse the files as comma separated values and load those files to the data warehouse 40.

In some instances, it may be desirable for the fail-safe AI model 76 to use a supervised learning model where an evolving fail-safe model is desired which constantly learns based on the past data. Assume that in such an embodiment a new source folder of files was added and the primary AI model failed to predict an outcome. Based on this failure and based on initial learning data, the fail-safe AI model 76 may predict that the files should be treated as comma separated values. A system user may then correct this to treat the files as tab separated values using a feedback UI. This feedback would be incorporated as training data of the fail-safe AI model 76 which could then be used to periodically retrain the fail-safe AI model.

In some embodiments, the fail-safe AI model 76 may be a complex AI model which uses a collection of lower level AI models that predict an outcome with a confidence metric for complex DSS or a simple exception handler for a simple DSS. The multiple lower level AI models could be used to predict (possibly simultaneously) DSS updates in different ways. For example, different subsets of input columns could be assigned to respective lower level AI models to predict outcomes based on those input columns. Then, a master algorithm (i.e., meta-learner), which itself is a supervised learning model, could determine a DSS update based on the original input columns at issue and the outcomes of the lower level algorithms. In other words, the fail-safe AI model need not be one single algorithm, it could be a collection of few simple algorithms whose results intermediate results are then consolidated and orchestrated by the master algorithm/meta learner to determine DSS updates. In such embodiments, this entire group of algorithms for the fail-safe AI model 76 could be collectively referred to as a "complex AI model."

This differs from the rule-based AI model 72 and case-based AI model 74 which are less complex. With the fail-safe AI model 76, the final outcome is chosen from the model with the highest confidence, or by a stacked AI model with a meta-learner model. The fail-safe AI model 76 may have a collection of models that work on features derived from data warehousing fields like source table, source table type, source type, source column, source column data type, levels in source column, source table/column usage statistics from a database, etc. Features for these models may be extracted from various inputs such as database usage statistics, data source metadata, training data from previous data warehouse projects, etc.

The collection of lower level models are a collection of supervised and/or unsupervised machine learning algorithms based on the requirement. If the data warehouse 40 is supposed to target complex use cases (i.e., complex DSS updates), then unsupervised models like clustering could be preferable. If the requirements are simpler, then a simple decision tree may be more appropriate for predicting the decision outcome for the change. Multiple classifications models can be used, one for each table, so that the dependent variable that is being predicted predicts what action is to be taken for a change in the set of data sources 30 based on the model corresponding to the table in which the change occurs. On top of classification/prediction, clustering can help identify all the columns that belong in a table in the data warehouse 40 (e.g., so that each column becomes an entity which needs to be clustered into a group).

For simpler data warehouses 40, the AI engine 70 may chooses the final decision based on a confidence metric of its lower level AI models. As discussed above, stacked AI models with a meta-learner may be used to improve accuracy over time and for complex data warehouses. The meta-learner model learns over time on the lower models and improves accuracy with time. For highly simple but concise data warehouses reinforcement learning can be used to train the AI to take decisions in the AI engine.

Figure 6:
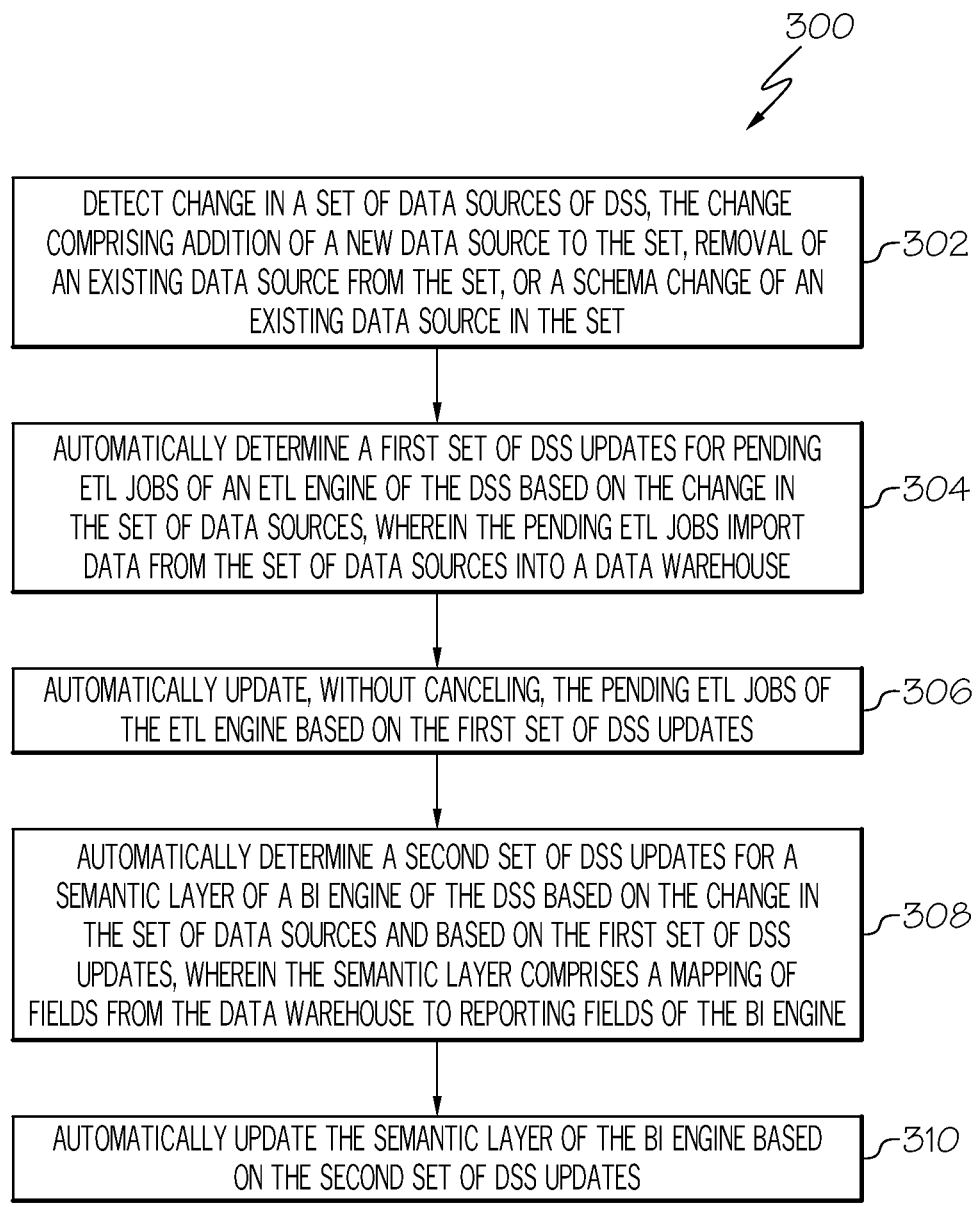
FIG. 6 illustrates a computer-implemented method performed by an AI engine to determine and implement DSS updates.

FIG. 6 illustrates a computer-implemented method 300 that is implemented by the AI engine 70. The method 300 is a broader formulation of what is described in FIGS. 2-3 above. The AI engine 70 detects a change in a set 30 of data sources of DSS 20 (block 302). The change comprises addition of a new data source to the set 30, removal of an existing data source from the set 30, or a schema change of an existing data source in the set 30. Some example schema changes of an existing data source could include, e.g., column addition, column addition, column renaming, etc. The AI engine 70 automatically determines a first set of DSS updates for pending ETL jobs 46 of ETL engine 44 of the DSS 20 (block 304) based on the change in the set of data sources. The pending ETL jobs 46 import data from the set 30 of data sources into a data warehouse 40. The AI engine 70 automatically updates, without canceling, the pending ETL jobs 46 of the ETL engine 44 based on the first set of DSS updates (block 306). The AI engine 308 also automatically determines a second set of DSS updates for semantic layer 50 of BI engine 80 of the DSS 20 based on the change in the set of data sources, and based on the first set of DSS updates (block 308). The semantic layer 50 comprises a mapping of fields from the data warehouse 40 to reporting fields of the BI engine 80. The AI engine 70 automatically updates the semantic layer 50 of the BI engine 80 based on the second set of DSS updates (block 310). Thus, in the method 300 the "first set" of DSS updates are for the ETL engine 44, whereas the "second set" of DSS updates are for the BI engine 80. Each "set" of updates could include multiple updates, or a single update.

In some embodiments of the method 300, the automatic updating of the pending ETL jobs 46 of the ETL engine (block 306) comprises automatically transmitting DSS reconfiguration instructions to the ETL engine 44 that instruct the ETL engine 44 to update the pending ETL jobs 46 without cancelation of the pending ETL jobs 46. Such embodiments may occur where the AI engine 70 and ETL engine 44 are hosted on separate computing devices. In other embodiments, the AI engine 70 directly modifies the ETL jobs 46 instead of doing so indirectly through the ETL engine 44.

As discussed above, the ETL engine 44 may be configured to execute its pending ETL jobs 46 in a configuration inflation mode of operation.

In some embodiments of the method 300, the AI engine 70 automatically transmits schema update instructions to the ETL engine 44 based on the first set of DSS updates, wherein the schema update instructions instruct the ETL engine 44 to update a schema of the data warehouse 40 to reflect the change in the set 30 of data sources. In some such embodiments, the schema updates of the data warehouse 40 would occur before corresponding ETL jobs that import data according to that schema are executed. Thus, for example, if a new column was being added, the ETL engine would, in some embodiments, update the schema of the data warehouse 40 to reflect the addition of the column before importing data contained in the new column into the data warehouse 40.

In some embodiments of the method 300, automatically updating the semantic layer 50 of the BI engine 80 (block 310) includes automatically invoking an API of the BI engine 80 to cause the BI engine 80 to update its semantic layer 50.

In some embodiments of the method 300, automatically updating the semantic layer 50 of the BI engine 80 yields an updated semantic layer, and the method 300 includes automatically invoking an API of the BI engine 80 to cause the BI engine 80 to update, based on the updated semantic layer, its existing report templates that comprise data from data repository 42 in the data warehouse 40.

In some embodiments of the method 300, automatically determining the first set of DSS updates (block 304) for pending ETL jobs 46 of the ETL engine includes analyzing historical DSS updates performed for previous changes to the set 30 of data sources; attempting to determine first potential DSS updates using a primary AI model; and if the attempting identifies first potential DSS updates that have a confidence metric that is above a predefined threshold, including the first potential DSS updates in the first set of DSS updates. In this regard the "primary" AI model could include the rule-based AI model 72 or case-based AI model 74.

If the attempting to determine first potential DSS updates fails, or if first potential DSS updates are determined but a confidence metric of the first potential DSS updates is below a predefined threshold, the AI engine 70 uses a secondary AI model (e.g., the fail-safe AI model 76) to determine second potential DSS updates, and includes the second potential DSS updates in the first set of DSS updates.

In some embodiments of the method 300, the data source that is added, removed, or has its schema changed is a table, and the automatic determining of the first set of DSS updates (block 304) based on the change in the set of data sources comprises:
  determining a DSS update rule for the change in the set 30 of data sources as a function of a data model of the data warehouse, a table type of the table, and the change that was detected in the table; and
  determining the first set of DSS updates (block 304) based on the DSS update rule.

The detecting of the change in the set of data sources (block 304) may include analyzing metadata of the set 30 of data sources of the DSS 20, and detecting the change in the set 30 of data sources based on a change in the metadata of the set 30 of data sources. In some embodiments, the AI engine 70 receives an alert that specifically indicates what data source has changed and/or what that change is. In other embodiments, the AI engine 70 does not receive such alerts, but must instead proactively monitor the set 30 of data sources for changes (e.g., periodically queries them to detect if they have been changed).

Figure 7A:
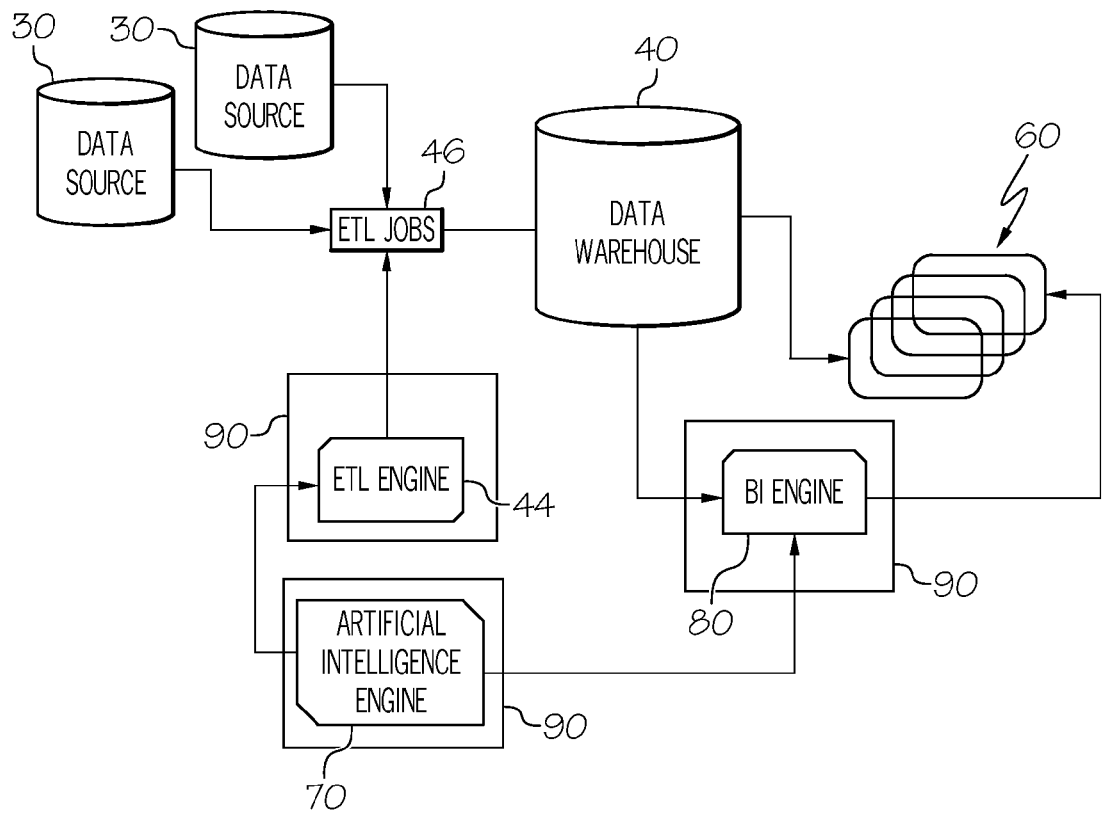
FIGS. 7A-B illustrate a plurality of example hardware configurations for AI engine of FIG. 1.
Figure 7B:
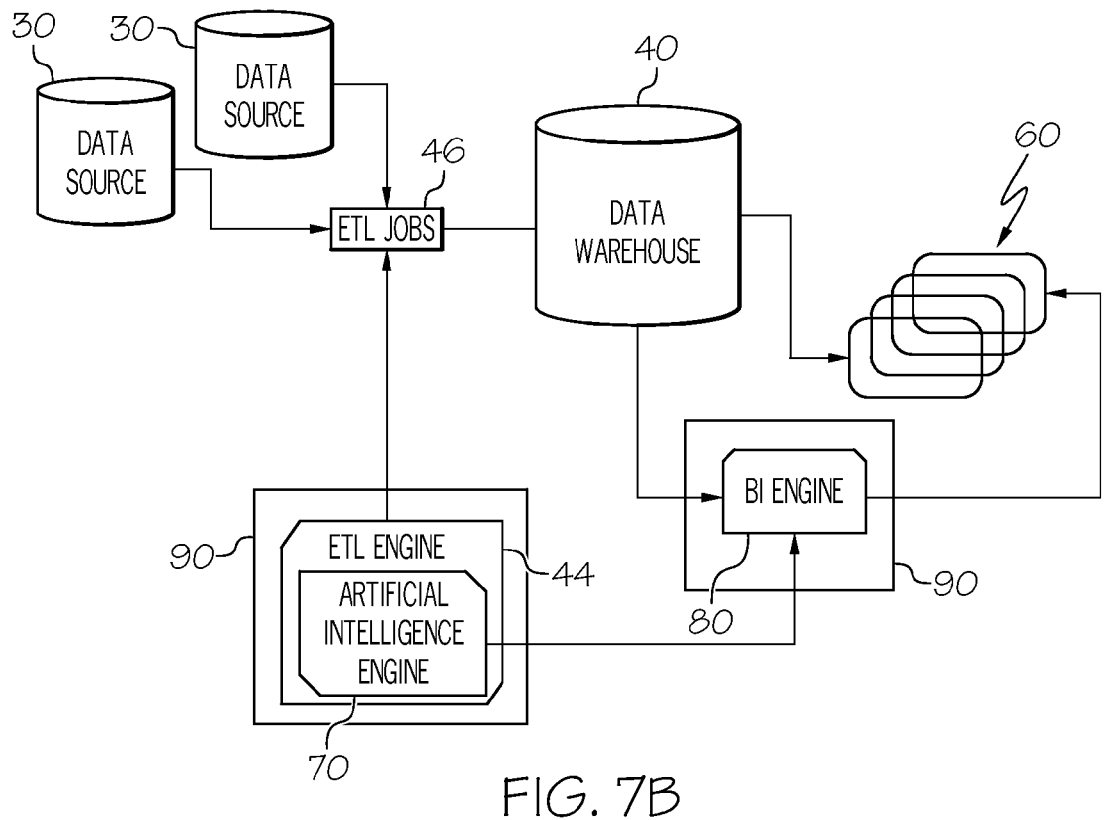

FIGS. 7A-D illustrate a plurality of example hardware configurations for AI engine 70 1. In FIG. 7A, the AI engine 70, BI engine 80, and ETL engine 44 each reside on separate servers 90. In the example of FIG. 7B, however, the AI engine 70 and ETL engine 44 reside on a single server 90, which is separate from a computing device 90 on which the BI engine 80 resides. As shown in FIG. 7B, the AI engine 70 may be part of the ETL engine 44. In some such embodiments, logic of the AI engine may be embedded into the ETL jobs themselves (e.g., if-then-else constructs of the HCC AI model 71 could be included in the ETL jobs 46). Other configurations could also be possible. For example, in so-called data federation embodiments in which runtime ETL is provided from the BI engine 80 (i.e., the BI engine 80 acts as the ETL engine), a same computing device may act as the BI engine, AI engine, and ETL engine.

Figure 8:
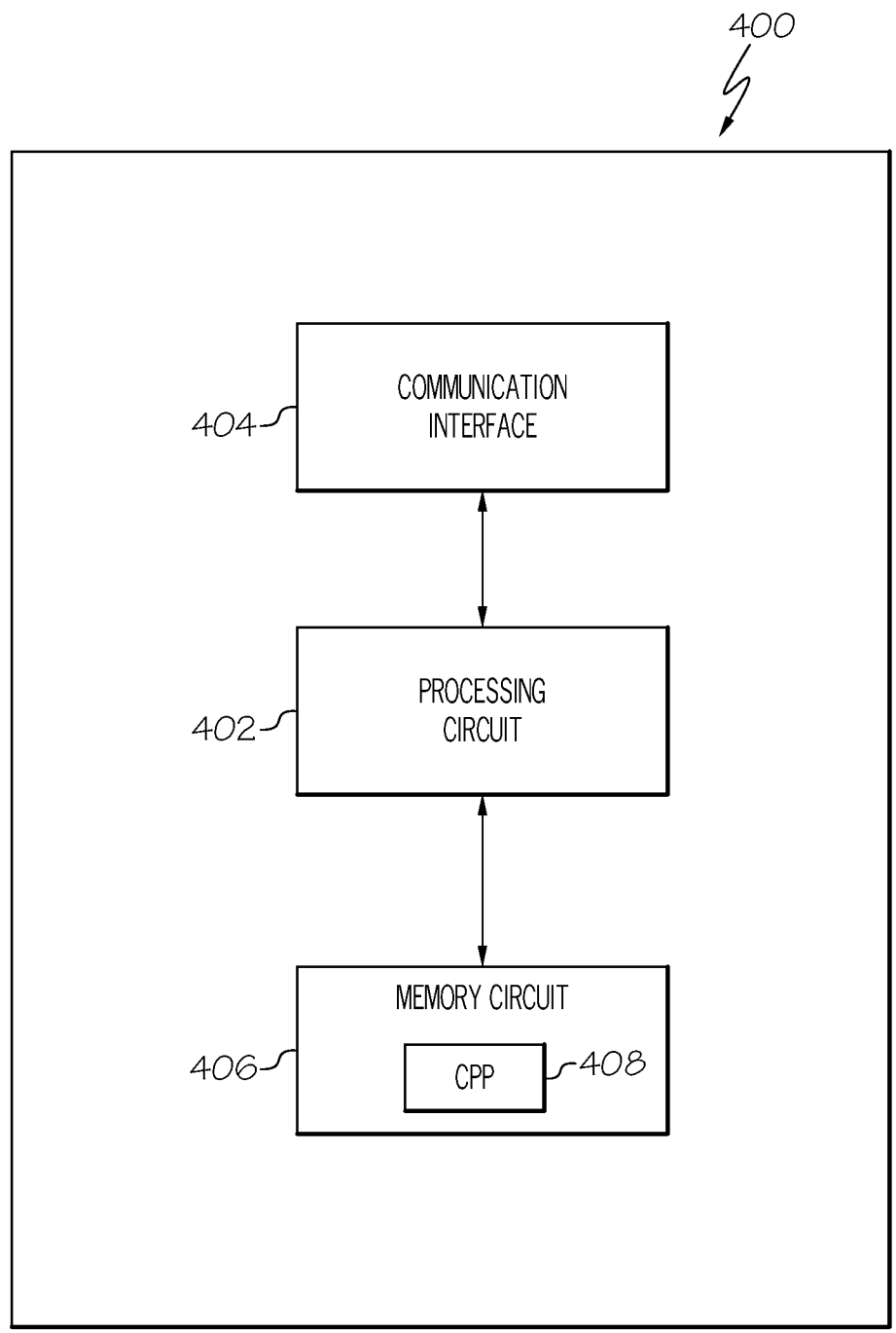
FIG. 8 illustrates a computing device configured as the AI engine of FIG. 1.

FIG. 8 illustrates a computing device 400 configured as the AI engine 70 of FIG. 1. The computing device 400 may be configured to implement any combination of the techniques discussed above. The computing device 400 includes a communication interface 404 and one or more processing circuits (shown as "processing circuit" 402) that are communicatively connected to the communication interface 404. The communication interface 404 is configured to communicate with ETL engine 44 of a DSS 20, BI engine 80 of the DSS 20, or both the ETL engine 44 and the BI engine 80. The processing circuit 402 is configured to detect a change in a set 30 of data sources of the DSS 20, with the change comprising addition of a new data source to the set 30, removal of an existing data source from the set 30, or a schema change of an existing data source in the set 30.

The processing circuit 402 is further configured to automatically determine a first set of DSS updates for pending ETL jobs 46 of the ETL engine 44 based on the change in the set 30 of data sources, wherein the pending ETL jobs 46 import data from the set 30 of data sources into data warehouse 40. The processing circuit 402 is further configured to automatically update, without canceling, the pending ETL jobs 46 of the ETL engine 44 based on the first set of DSS updates. The processing circuit 402 is further configured to automatically determine a second set of DSS updates for semantic layer 50 of the BI engine 80 based on the change in the set 30 of data sources and based on the first set of DSS updates. The semantic layer 50 comprises a mapping of fields from the data warehouse 40 to reporting fields of the BI engine 80. The processing circuit 402 is further configured to automatically update the semantic layer 50 of the BI engine 80 based on the second set of DSS updates. As discussed above, the AI engine 70 may be executed by its own server, or may share a server with one or both of the ETL engine 44 and BI engine 80.

The computing device 400 also includes a memory circuit 406 which is a computer readable storage medium that stores instructions for operation of the AI engine 70. The memory circuit 406 may also store data describing historical DSS updates performed for previous changes to the set 30 of data sources, which could serve as the basis for the utilization of the case-based AI model 74 and/or fail-safe AI model 76.

In one or more embodiments, the memory circuit 406 includes a computer program product 408. The computer program product 406 comprises a computer readable storage medium (e.g., memory circuit 406, or some other storage device) having computer readable program code embodied therewith, the computer readable program code comprises:

computer readable program code configured to detect a change in a set 30 of data sources of DSS 20, the change comprising addition of a new data source to the set 30, removal of an existing data source from the set 30, or a schema change of an existing data source in the set 30;

computer readable program code configured to automatically determine a first set of DSS updates for pending ETL jobs 46 of an ETL engine 44 of the DSS 20 based on the change in the set of data sources, wherein the pending ETL jobs 46 import data from the set 30 of data sources into a data warehouse 40;

computer readable program code configured to automatically update, without canceling, the pending ETL jobs 46 of the ETL engine 44 based on the first set of DSS updates;

computer readable program code configured to automatically determine a second set of DSS updates for a semantic layer 50 of BI engine 80 of the DSS 20 based on the change in the set 30 of data sources and based on the first set of DSS updates, wherein the semantic layer 50 comprises a mapping of fields from the data warehouse 40 to reporting fields of the BI engine 80; and computer readable program code configured to automatically update the semantic layer 50 of the BI engine 80 based on the second set of DSS updates.

The embodiments discussed herein offer a number of improvements over the prior art. The DSS 20 described above is intelligent, resilient, and self-governing in that it automatically adapts to changes in its source systems (i.e., data sources). Enhancements to a data warehouse (e.g., new dimensions, measures, utilities) are automatic or at least wouldn't require substantially less efforts than these updates would have required in the prior art. It is believed these features will lead to reduction of DSS support and maintenance activities to negligible levels. Also, the techniques described above may be utilized such that BI components are automatically up-to-date for a longer duration of time, which can justify their huge licensing costs. The down-time for data source upgrades and enhancements could be reduced or possibly even non-existent. Thus, DSSs, which have traditionally been difficult to maintain, can be made much more agile. The techniques discussed above could also make it more feasible to have ETL and BI features be cloud-based and/or software as a service (SaaS) based, which traditionally has not been the possible due to the highly customized nature of DSSs. However, using the techniques described above, a DSS can be made more self-governing, and it would be feasible to have a software-as-a-service (SaaS) model so that a DSS for an organization could be cloud based and/or could be maintained and distributed as a service.

The DSS automatic updating techniques discussed above could also be used in connection with schema and data migration between databases (e.g., by tweaking a DSS 20 into thinking that one of the databases is a data source, and that the other of the databases is a target database). Thus, the techniques described above could be used, e.g., to migrate an ORACLE database to a SQL SERVER database.

In some of the embodiments discussed above, the DSS 20 may provide a rollback/undo feature which would enable a user to undo an automatic change to the DSS 20 that is undesired. For example, if the fail-safe AI model 76 resulted in DSS updates that were incorrect, this rollback/undo feature would enable a user to undo the changes, such that the correct change could be implemented. These errors would be fed to the fail-safe AI model 76 to further train the model 76.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    detecting a change in a set of data sources of a decision support system (DSS), the change comprising addition of a new data source to the set, removal of an existing data source from the set, or a schema change of an existing data source in the set;
    automatically determining a first set of DSS updates for pending extract, transform, load (ETL) jobs of an ETL engine of the DSS based on the change in the set of data sources, wherein the pending ETL jobs import data from the set of data sources into a data warehouse, and wherein automatically determining the first set of DSS updates for pending ETL lobs of the ETL engine comprises:
        analyzing historical DSS updates performed for previous changes to the set of data sources;
        attempting to determine first potential DSS updates using a primary artificial intelligence (AI) model; and
        if the attempting identifies first potential DSS updates that have a confidence metric that is above a predefined threshold, including the first potential DSS updates in the first set of DSS updates;
    automatically updating, without canceling, the pending ETL jobs of the ETL engine based on the first set of DSS updates;
    automatically determining a second set of DSS updates for a semantic layer of a business intelligence (BI) engine of the DSS based on the change in the set of data sources and based on the first set of DSS updates, wherein the semantic layer comprises a mapping of fields from the data warehouse to reporting fields of the BI engine; and
    automatically updating the semantic layer of the BI engine based on the second set of DSS updates.

2. The computer-implemented method of claim 1, wherein automatically updating, without canceling, the pending ETL jobs of the ETL engine based on the first set of DSS updates comprises automatically transmitting DSS reconfiguration instructions to the ETL engine that instruct the ETL engine to update the pending ETL jobs without cancelation of the pending ETL jobs.

3. The computer-implemented method of claim 1, wherein the ETL engine is configured to execute the pending ETL jobs in a configuration inflation mode of operation.

4. The computer-implemented method of claim 1, further comprising:
    automatically transmitting schema update instructions to the ETL engine based on the first set of DSS updates, wherein the schema update instructions instruct the ETL engine to update a schema of the data warehouse to reflect the change in the set of data sources.

5. The computer-implemented method of claim 1, wherein automatically updating the semantic layer of the BI engine based on the second set of DSS updates comprises:
    automatically invoking an Application Programming Interface (API) of the BI engine to cause the BI engine to update its semantic layer.

6. The computer-implemented method of claim 1, wherein automatically updating the semantic layer of the BI engine yields an updated semantic layer, the method further comprising:
    automatically invoking an Application Programming Interface (API) of the BI engine to cause the BI engine to update, based on the updated semantic layer, its existing report templates that comprise data from the data warehouse.

7. The computer-implemented method of claim 1, wherein automatically determining the first set of DSS updates further comprises:
    if the attempting to determine first potential DSS updates fails, or if first potential DSS updates are determined but a confidence metric of the first potential DSS updates is below a predefined threshold, using a secondary AI model to determine second potential DSS updates, and including the second potential DSS updates in the first set of DSS updates.

8. The computer-implemented method of claim 1, wherein the data source that is added, removed, or has its schema changed is a table, and wherein automatically determining the first set of DSS updates based on the change in the set of data sources comprises:
    determining a DSS update rule for the change in the set of data sources as a function of a data model of the data warehouse, a table type of the table, and the change that was detected in the table; and
    determining the first set of DSS updates based on the DSS update rule.

9. The computer-implemented method of claim 1, wherein detecting the change in the set of data sources comprises:
   analyzing metadata of the set of data sources of the DSS; and
   detecting the change in the set of data sources based on a change in the metadata of the set of data sources.

10. A computing device comprising:
   a communication interface configured to communicate with an extract, transform, load (ETL) engine of a decision support system (DSS), a business intelligence (BI) engine of the DSS, or both the ETL engine and the BI engine; and
   a processing circuit communicatively connected to the communication interface and configured to:
      detect a change in a set of data sources of the DSS, the change comprising addition of a new data source to the set, removal of an existing data source from the set, or a schema change of an existing data source in the set;
      automatically determine a first set of DSS updates for pending ETL jobs of the ETL engine based on the change in the set of data sources, wherein the pending ETL jobs import data from the set of data sources into a data warehouse, and wherein to automatically determine the first set of DSS updates for pending ETL jobs of the ETL engine, the processing circuit is configured to:
         analyze historical DSS updates performed for previous changes to the set of data sources;
         attempt to determine first potential DSS updates using a primary artificial intelligence (AI) model; and
         if the attempt identifies first potential DSS updates that have a confidence metric that is above a predefined threshold, include the first potential DSS updates in the first set of DSS updates;
      automatically update, without canceling, the pending ETL jobs of the ETL engine based on the first set of DSS updates;
      automatically determine a second set of DSS updates for a semantic layer of the BI engine based on the change in the set of data sources and based on the first set of DSS updates, wherein the semantic layer comprises a mapping of fields from the data warehouse to reporting fields of the BI engine; and
      automatically update the semantic layer of the BI engine based on the second set of DSS updates.

11. The computing device of claim 10, wherein to automatically update, without canceling, the pending ETL jobs of the ETL engine based on the first set of DSS updates, the processing circuit is configured to automatically transmit DSS reconfiguration instructions to the ETL engine that instruct the ETL engine to update the pending ETL jobs without cancelation of the pending ETL jobs.

12. The computing device of claim 10, wherein the ETL engine is configured to execute the pending ETL jobs in a configuration inflation mode of operation.

13. The computing device of claim 10, wherein the processing circuit is further configured to:
   automatically transmit schema update instructions to the ETL engine based on the first set of DSS updates, wherein the schema update instructions instruct the ETL engine to update a schema of the data warehouse to reflect the change in the set of data sources.

14. The computing device of claim 10, wherein to automatically update the semantic layer of the BI engine based on the second set of DSS updates, the processing circuit is configured to:
   automatically invoke an Application Programming Interface (API) of the business engine to cause the business engine to update its semantic layer.

15. The computing device of claim 10, wherein the automatic update of the semantic layer of the BI engine yields an updated semantic layer, and wherein the processing circuit is further configured to:
   automatically invoke an Application Programming Interface (API) of the BI engine to cause the BI engine to update, based on the updated semantic layer, its existing report templates that comprise data from the data warehouse.

16. The computing device of claim 10, wherein to automatically determine the first set of DSS updates, the processing circuit is further configured to:
   if the attempt to determine first potential DSS updates fails, or if first potential DSS updates are determined but a confidence metric of the first potential DSS updates is below a predefined threshold, use a secondary AI model to determine second potential DSS updates, and include the second potential DSS updates in the first set of DSS updates.

17. The computing device of claim 10, wherein the data source that is added, removed, or has its schema changed is a table, and wherein to automatically determine the first set of DSS updates based on the change in the set of data sources, the processing circuit is configured to:
   determine a DSS update rule for the change in the set of data sources as a function of a data model of the data warehouse, a table type of the table, and the change that was detected in the table; and
   determine the first set of DSS updates based on the DSS update rule.

18. The computing device of claim 10, wherein to detect the change in the set of data sources, the processing circuit is configured to:
   analyze metadata of the set of data sources of the DSS; and
   detect the change in the set of data sources based on a change in the metadata of the set of data sources.

19. A computer program product comprising:
   a computer readable storage medium having computer readable program code embodied therewith that, when executed on processing circuitry, the processing circuitry to:
      detect a change in a set of data sources of a decision support system (DSS), the change comprising addition of a new data source to the set, removal of an existing data source from the set, or a schema change of an existing data source in the set;
      automatically determine a first set of DSS updates for pending extract, transform, load (ETL) jobs of an ETL engine of the DSS based on the change in the set of data sources, wherein the pending ETL jobs import data from the set of data sources into a data warehouse, and wherein to automatically determine the first set of DSS updates for pending ETL jobs of the ETL engine, the computer readable program code causes the processing circuitry to:
         analyze historical DSS updates performed for previous changes to the set of data sources;

attempt to determine first potential DSS updates using a primary artificial intelligence (AI) model; and if the attempt identifies first potential DSS updates that have a confidence metric that is above a predefined threshold, include the first potential DSS updates in the first set of DSS updates;

automatically update, without canceling, the pending ETL jobs of the ETL engine based on the first set of DSS updates;

automatically determine a second set of DSS updates for a semantic layer of a business intelligence (BI) engine of the DSS based on the change in the set of data sources and based on the first set of DSS updates, wherein the semantic layer comprises a mapping of fields from the data warehouse to reporting fields of the BI engine; and automatically update the semantic layer of the BI engine based on the second set of DSS updates.

\* \* \* \* \*